United States Patent [19]
Ohtake

[11] Patent Number: 5,739,956
[45] Date of Patent: Apr. 14, 1998

[54] REAL IMAGE ALBADA FINDER

[75] Inventor: Katsuhiro Ohtake, Omiya, Japan

[73] Assignee: Fuji Photo Optical Co., Ltd., Omiya, Japan

[21] Appl. No.: 733,141

[22] Filed: Oct. 16, 1996

[30] Foreign Application Priority Data

Oct. 17, 1995 [JP] Japan .................... 7-268494

[51] Int. Cl.⁶ .................... G02B 17/00; G02B 25/00
[52] U.S. Cl. .................... 359/643; 359/730; 359/731; 359/732; 359/733; 359/727
[58] Field of Search .................... 359/643–647, 359/727, 730–736

[56] References Cited

U.S. PATENT DOCUMENTS

| | | | |
|---|---|---|---|
| 4,952,956 | 8/1990 | Kikuchi | 354/224 |
| 5,231,534 | 7/1993 | Kato | 359/432 |
| 5,453,809 | 9/1995 | Miyano | 354/219 |
| 5,491,528 | 2/1996 | Takato et al. | 359/726 |

*Primary Examiner*—David C. Nelms
*Assistant Examiner*—Evelyn A. Lester
*Attorney, Agent, or Firm*—Sixbey, Friedman, Leedom & Ferguson; David S. Safran

[57] ABSTRACT

There is provided an objective lens for focusing a subject light to form a real image on a predetermined focal plane, an eyepiece through which the real image is observed, and the first and second prism assemblies between the objective lens and the eyepiece for erecting an inverted image. The first and second prism assemblies are arranged at a predetermined distance away from each other such that the exit surface of the first prism assembly and the incident surface of the second prism assembly face each other across the focal plane. As a result, the dust on the whole surface of the prism assemblies and the like are made inconspicuous. Moreover, a visual field frame is provided on the focal plane, so that the visual field frame can be prevented from becoming out of focus and the border of the visual field can be seen clearly. Furthermore, a virtual image of a mark such as a target mark is formed in the Albada method.

7 Claims, 2 Drawing Sheets

REAL IMAGE ALBADA FINDER

BACKGROUND OF THE INVENTION

1. Field of the Invention

The present invention relates to a real image Albada finder, and more particularly to a real image Albada finder which makes the dust on the optical members and the like in the finder inconspicuous.

2. Description of the Related Art

In the conventional real image finder, the exit surface or the incident surface of a prism, which is a member of the erecting system for erecting an inverted image formed by the objective lens, is arranged on the focal plane of the objective lens. The marks such as a target mark and a parallax compensation mark are formed on the surface which is arranged on the focal plane, and a visual field frame is attached to the surface. The target mark, etc. as well as the real image, which is formed in the visual field on the focal plane by the objective lens, can be observed through the eyepiece.

However, if the plane on which the objective lens forms the image is the surface of the prism, the dust on the surface and the foreign substances mixed in the prism and close to the surface are observed through the eyepiece, so that the dust, etc. are conspicuous.

In order to solve the aforementioned problem, a method is proposed in which a whole surface of the prism is arranged away from the focal plane, so that the dust on the surface, etc. can be made inconspicuous (that is, the dust and other matter are not focused by the eyepiece.) In this case, however, there is a disadvantage in that the marks such as the target mark cannot be provided in the finder such that they are visible in the visual field.

SUMMARY OF THE INVENTION

The present invention has been developed under the above-described circumstances, and has as its object the provision of a real image Albada finder which is able to make inconspicuous the dust on an exit surface or an incident surface of the optical systems and the like in a finder, and makes a target mark, etc. visible in the visual field.

In order to achieve the above-mentioned object, a real image Albada finder of the present invention; which comprises an objective lens for focusing a subject light to form a real image on a predetermined focal plane, an eyepiece through which the real image is observed, and an erecting optical system arranged between the objective lens and the eyepiece for erecting an inverted image; is characterized in that an optical member or optical members which compose the erecting optical system are arranged such that a whole surface of the optical member or members is away from the focal plane so as to make dust on the surface and foreign substances mixed in the optical member or members and close to the surface inconspicuous. Moreover, a visual field frame is provided on the focal plane, so that the visual field can be prevented from becoming out of focus and the border of the visual field can be seen clearly. Furthermore, there is provided an Albada display means for forming a virtual image of the marks such as the target mark in the Albada method.

The Albada display means is constructed in such a manner that a semi-transparent concave mirror is formed on the incident surface of the optical member positioned at the eyepiece side of the focal plane, and the marks are painted with reflective coating on the surface of the aforementioned or another optical member which surface is located on the eyepiece side of the concave mirror. There is an advantage in adopting the Albada display means in that the target mark, etc. are visible in the visual field, and the smaller space is required compared to the lighting type.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
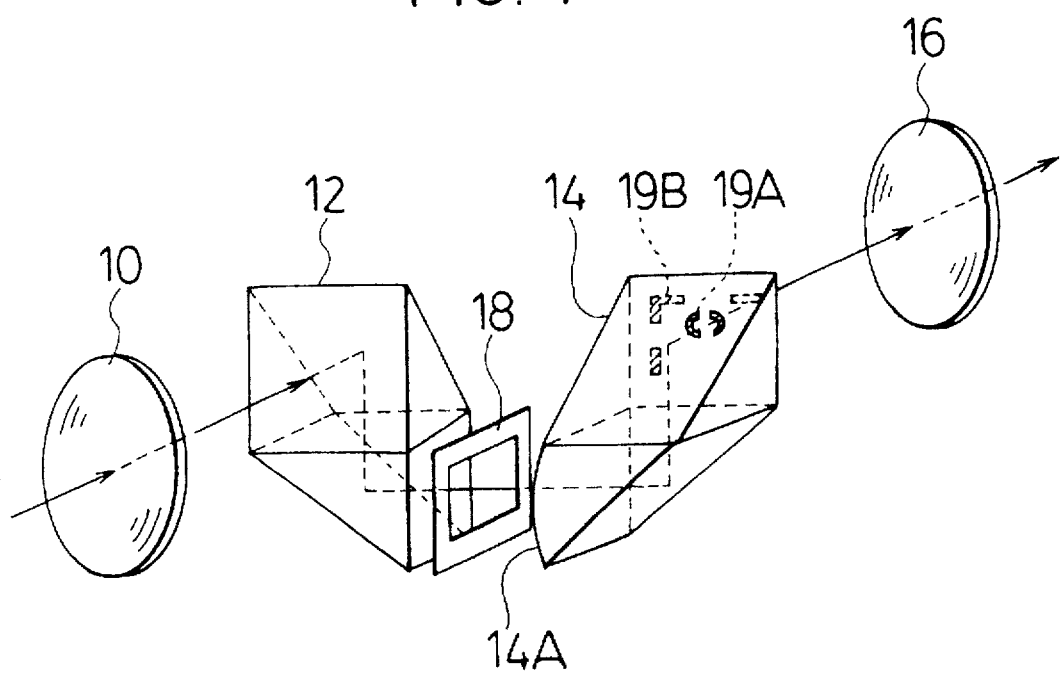
FIG. 1 is a perspective view illustrating the first embodiment of a real image Albada finder according to the present invention.
Figure 2:
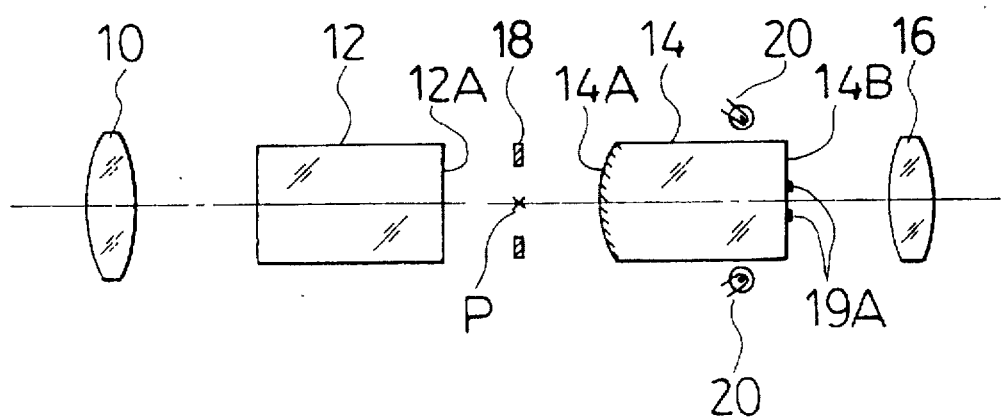
FIG. 2 is a view illustrating an outline of a finder optical system in FIG. 1.

FIG. 1 is a perspective view illustrating the first embodiment of a real image Albada finder according to the present invention, and FIG. 2 is a schematic view illustrating a finder optical system in FIG. 1.

As shown in the drawings, the real image Albada finder is composed mainly of an objective lens 10, a first prism assembly 12, a second prism assembly 14, an eyepiece 16, and a visual field frame 18. The first and second prism assemblies 12 and 14 compose the Porro prism erecting system. The subject light is focused by the objective lens 10 to form a real image (an aerial image) on the objective lens 10's focal plane at a predetermined position P between the first prism assembly 12 and the second prism assembly 14. The formed real image is magnified by the eyepiece 16 to be observed.

The real image formed by the objective lens 10 becomes an inverted image, which is reverse to the subject in the vertical and horizontal directions. It is changed to an erect image by the first and second prism assemblies 12 and 14. The first prism assembly 12 is arranged such that an exit surface 12A of the first prism assembly 12 is far away from the focal plane at the position P, and the second prism assembly 14 is arranged such that an incident surface 14A of the second prism assembly 14 is far away from the focal plane at the position P. As a result, the dust on the exit surface 12A and the incident surface 14A, and the foreign substances mixed in the first prism assembly 12 and close to the exit surface 12A and mixed in the second prism assembly 14 and close to the incident surface 14A are made inconspicuous. That is, the eyepiece 16 focuses the focal plane at the position P, so that the dust on the exit surface 12A and the incident surface 14A, which are away from the focal plane, and the like are not focused. Hence, the dust and other matter can be made inconspicuous.

The visual field frame 18 is arranged on the focal plane at the position P, so that the visual field frame 18 is not out of focus, and the border of the visual field can be seen clearly.

Next, an explanation will be given about an Albada display means which forms a virtual image of the marks such as a target mark.

The Albada display means is integrated with the second prism assembly 14. That is, the incident surface 14A of the second prism assembly 14 is formed in such a manner as to have a predetermined curvature, and it is half-coated so as to be a semitransparent concave mirror. The marks such as a target mark 19A and a parallax compensation mark 19B (see FIG. 1) are painted with reflective coating on the exit surface 14B of the second prism assembly 14.

In the Albada display means constructed in the above-mentioned manner, the marks such as the target mark 19A are illuminated by light passing through the objective lens 10 and the first and second prism assemblies 12 and 14. The light is reflected on the marks on the exit surface 14B, and then it is further reflected on the semitransparent concave mirror, which is formed on the incident surface 14A. Then, a virtual image of the marks is formed on the focal plane at the position P.

As a result, the marks such as the target mark 19A are visible in the visual field in the Albada method. An illumination lamp 20 may be provided to illuminate the marks as shown in FIG. 2.

Figure 3:
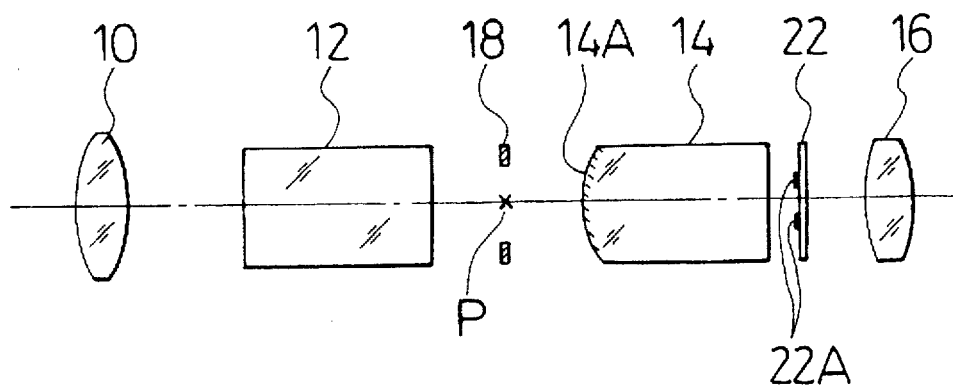
FIG. 3 is a view illustrating an outline of a finder optical system in the second embodiment of a real image Albada finder according to the present invention.

FIG. 3 is a schematic view of a finder optical system in the second embodiment of the real image Albada finder according to the present invention. Incidentally, parts similar to those previously described with reference to FIG. 2 are denoted by the same reference numerals, and a detailed explanation is not provided here.

In the real image Albada finder in FIG. 3, the marks such as the target mark are not painted on the exit surface of the second prism assembly 14, but the marks such as a target mark 22A are painted with reflective coating on a reticle plate 22, which is provided between the second prism assembly 14 and the eyepiece 16. Incidentally, a position where the marks are formed is not restricted to the previously-described embodiment, and the essential thing is to form the marks to the eyepiece side with regard to the incident surface 14A of the second prism assembly 14, on which the semitransparent concave mirror is formed.

Figure 4:
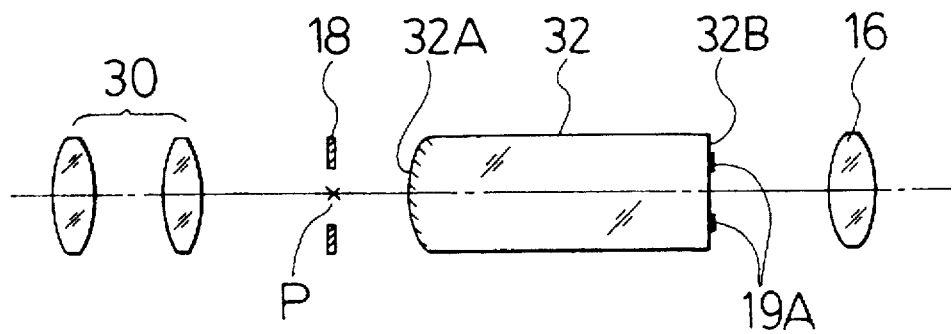
FIG. 4 is a view illustrating an outline of a finder optical system in the third embodiment of a real image Albada finder according to the present invention.

FIG. 4 is a schematic view illustrating a finder optical system in the third embodiment of the real image Albada finder according to the present invention. Incidentally, parts similar to those previously described with reference to FIG. 2 are denoted by the same reference numerals, and a detailed explanation is not provided here.

The real image Albada finder in FIG. 4 has an objective lens 30 provided with a zooming function, and a prism assembly 32. In this embodiment, the Porro prism erecting system is composed only of the prism assembly 32. The subject light is focused by the objective lens 30 to form a real image on the objective lens 30's focal plane at a predetermined position P between the objective lens 30 and the prism assembly 32. The formed real image is erected by the prism assembly 32, and then it is observed through the eyepiece 16. The prism assembly 32 has the same means as the Albada display means, which is provided in the second prism assembly 14 shown in FIG. 2. That is, an incident surface 32A of the prism assembly 32 is formed in such a manner as to have a predetermined curvature, and it is half-coated so as to be a semitransparent concave mirror. The marks such as the target mark 19A are painted on an exit surface 32B of the prism assembly 32 with reflective coating. Consequently, a virtual image of the marks such as the target mark 19A is formed on the focal plane at the position P.

As set forth hereinabove, according to the real image Albada finder of the present invention, the whole surface of the optical member or members which compose the erecting system in the finder is arranged away from the focal plane of the objective lens. As a result, the dust on the surface and the foreign substances mixed in the optical member or members and close to the surface can be made inconspicuous. Furthermore, by using the Albada display means, the marks such as the target mark are visible in the visual field, and the smaller space is required compared to the lighting type.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A real image Albada finder having an objective lens for focusing a subject light to form a real image on a predetermined focal plane, an eyepiece through which said real image is observed, and an erecting optical system arranged between said objective lens and said eyepiece for erecting an inverted image, comprising:

an optical member or optical members which compose said erecting optical system and are arranged such that a whole surface of said optical member or members is away from said focal plane so as to make dust on said surface and foreign substances mixed in said optical member or members and close to said surface inconspicuous;

a visual field frame provided on said focal plane; and

Albada display means for forming a virtual image of a mark within said focal plane in an Albada method.

2. The real image Albada finder as defined in claim 1, wherein said erecting optical system is composed of a first prism assembly and a second prism assembly which are arranged at a predetermined distance away from each other so that an exit surface of said first prism assembly and an incident surface of said second prism assembly face each other across said focal plane.

3. The real image Albada finder as defined in claim 2, wherein said Albada display means is constructed in such a manner that a semitransparent concave mirror is formed on said incident surface of said second prism assembly located on the eyepiece side of said focal plane, and said mark is painted with reflective coating on an exit surface of said second prism assembly.

4. The real image Albada finder as defined in claim 2, wherein said Albada display means is constructed in such a manner that a semitransparent concave mirror is formed on said incident surface of said second prism assembly located on the eyepiece side of said focal plane, and said mark is painted with reflective coating on a reticle plate provided between said second prism assembly and said eyepiece.

5. The real image Albada finder as defined in claim 1, wherein said erecting optical system is composed of a prism assembly located on the eyepiece side of said focal plane.

6. The real image Albada finder as defined in claim 5, wherein said Albada display means is constructed in such a manner that a semitransparent concave mirror is formed on an incident surface of said prism assembly and said mark is painted with reflective coating on an exit surface of said prism assembly.

7. The real image Albada finder as defined in claim 5, wherein said Albada display means is constructed in such a manner that a semitransparent concave mirror is formed on an incident surface of said prism assembly and said mark is painted with reflective coating on a reticle plate provided between said prism assembly and said eyepiece.

* * * * *